(12) United States Patent
Williams et al.

(10) Patent No.: US 9,271,523 B2
(45) Date of Patent: Mar. 1, 2016

(54) ROTOR ASSEMBLY WITH ONE-PIECE FINGER MEMBER

(76) Inventors: Dennis Williams, Mesquite, TX (US); David K. Williams, Grapevine, TX (US)

( * ) Notice: Subject to any disclaimer, the term of this patent is extended or adjusted under 35 U.S.C. 154(b) by 713 days.

(21) Appl. No.: 13/478,595

(22) Filed: May 23, 2012

(65) Prior Publication Data
US 2013/0316037 A1 Nov. 28, 2013

(51) Int. Cl.
*B29C 47/08* (2006.01)
*A23P 1/12* (2006.01)

(52) U.S. Cl.
CPC .. *A23P 1/12* (2013.01); *B29C 47/08* (2013.01)

(58) Field of Classification Search
CPC ........ B29C 45/38; B29C 45/40; B29C 47/08; B29C 47/0818; B29C 47/0822; B29C 47/0828; B29C 47/96; A23P 1/12
USPC .................................................. 425/276, 281
See application file for complete search history.

(56) References Cited

U.S. PATENT DOCUMENTS

| | | | | |
|---|---|---|---|---|
| 2,549,559 | A * | 4/1951 | Abraham | 425/281 |
| 3,230,582 | A * | 1/1966 | Hoffman et al. | 425/67 |
| 3,402,682 | A | 9/1968 | Peden | |
| 3,541,946 | A | 11/1970 | Johnston | |
| 3,561,672 | A * | 2/1971 | Schlutz et al. | 494/1 |
| 3,676,029 | A * | 7/1972 | Hopkin | 425/67 |
| 3,808,962 | A * | 5/1974 | Liepa | 99/323.4 |
| 3,861,844 | A * | 1/1975 | Miller | 425/207 |
| 4,179,255 | A * | 12/1979 | Hale | 425/67 |
| 4,285,651 | A * | 8/1981 | Fetchu et al. | 425/192 R |
| 4,529,370 | A * | 7/1985 | Holmes et al. | 425/142 |
| 5,052,911 | A * | 10/1991 | Mikeska | 425/67 |
| 5,071,301 | A * | 12/1991 | Engelhardt et al. | 411/389 |
| 5,338,134 | A * | 8/1994 | Peng | 407/26 |
| 5,468,029 | A * | 11/1995 | Blose et al. | 285/328 |
| 5,496,137 | A * | 3/1996 | Ochayon et al. | 408/226 |
| 5,599,562 | A * | 2/1997 | Harris et al. | 425/67 |
| 6,280,672 | B2 | 8/2001 | Keehn | |
| 6,482,453 | B2 | 11/2002 | Wenger | |
| 6,516,650 | B1 * | 2/2003 | Watanabe | 72/469 |
| 6,537,050 | B1 * | 3/2003 | Kasai et al. | 425/67 |
| 7,275,926 | B2 | 10/2007 | Gomes | |
| 7,524,178 | B2 * | 4/2009 | Rosse et al. | 425/313 |
| 7,883,735 | B2 * | 2/2011 | Willoughby et al. | 426/625 |
| 8,029,721 | B2 | 10/2011 | Waatti | |
| 2004/0057811 | A1 * | 3/2004 | Kelzer | 411/389 |
| 2007/0119025 | A1 * | 5/2007 | Hu | 16/340 |
| 2007/0136995 | A1 * | 6/2007 | Hu et al. | 16/340 |
| 2008/0233224 | A1 * | 9/2008 | Rosse et al. | 425/8 |
| 2011/0081438 | A1 | 4/2011 | Hunter | |
| 2011/0280683 | A1 * | 11/2011 | Galipaud | 411/366.3 |
| 2013/0273209 | A1 * | 10/2013 | Baier et al. | 426/72 |
| 2013/0273219 | A1 * | 10/2013 | Baier et al. | 426/242 |

\* cited by examiner

*Primary Examiner* — Yogendra Gupta
*Assistant Examiner* — Emmanuel S Luk
(74) *Attorney, Agent, or Firm* — James E. Walton

(57) ABSTRACT

A rotor assembly for extruding randomly shaped food items includes a one-piece finger member. The one-piece finger member reduces the downtime of the extruding machine containing the rotor assembly by reducing the number of parts in the rotor assembly and reducing the adjustment necessary after finger replacement. The proprietary threaded interface between the finger member and the improved extruder machine allows for quick swap out during extruder maintenance.

7 Claims, 15 Drawing Sheets

ROTOR ASSEMBLY WITH ONE-PIECE FINGER MEMBER

BACKGROUND

1. Field of the Invention

The present invention relates in general to the field of extruders.

2. Description of Related Art

Machines for extruding, particularly those for extruding randomly shaped cornmeal snacks, include a random extruder assembly for shaping the snacks. For example, one type of randomly shaped cornmeal snacks sold under the trademark CHEETOS® is capable of being extruded from this extruder. CHEETOS® are but one brand of randomly shaped snacks that have been fabricated from extruders like this. FIG. 1 shows a conventional extruder machine 101 having a hopper assembly 103, a conveyer assembly 105, and an extruding assembly 107. Furthermore, extruding assembly 107 includes a rotor assembly 109, a stator assemble 111, and an auger assembly 113.

Referring now also to FIG. 2 in the drawings, a cross sectional view of conventional extruder machine 101 is illustrated. Material to be extruded, usually cornmeal with selected moisture content, is fed by auger assembly 113 from hopper assembly 103 to the extruder zone 115.

Referring now also to FIG. 3 in the drawings, a larger cross sectional view of conventional extruder machine 101 is illustrated. Extruding assembly 107 includes rotor assembly 109, stator assembly 111, and a servicing distance 117. Servicing distance 117 is the spacing between the rotor assembly 109 and the stator assembly 111. Servicing distance 117 is varied by moving the rotor assembly 109 in relation to the stator assembly 111. Typically while the machine 101 is serviced the servicing distance 117 is no more than a few inches. The servicing distance 117 allows a technician to maintain both the stator assembly 111 and the rotor assembly 109. Due to the servicing distance 117 having a limited amount of travel all tooling for maintenance to rotor assembly 109 and stator assembly 111 are limited in travel and therefore it is time consuming to remove a significant number of fasteners for maintenance of rotor assembly 109 and stator assembly 111.

Servicing distance 117 is minimized during operation of machine 101 to a very close gap of typically seventy thousands of an inch. Rotor assembly 109 rotates typically at six hundred rotations per minute. Both the rotor assembly 109 and the stator assembly 111 are heated and remain heated during operation of machine 101. As the cornmeal is expelled from the very close gap between rotor assembly 109 and stator assembly 111 the cornmeal twists and expands before falling on conveyer assembly 105.

Referring now also to FIG. 4 in the drawings, a perspective view of rotor assembly 109 and to FIG. 5 in the drawings, an exploded view of rotor assembly 109, both are illustrated. Rotor assembly 109 includes a rotor coupling 141 secured to a rotor base 145 by rotor base set screws 149. Located between rotor coupling 141 and rotor base 145 is a dowel pin 143. A die plate 153 is coupled to rotor base 145 by socket cap screws 157. Die plate 153 is typically made of bronze. Bronze has been the material of choice for the die plate because of the thermal properties of bronze. Socket cap screws 157 are located on the back side of the die plate 153 to prevent the extruding material from filling the screw head cavity. Die fingers 161 are located in openings in rotor base 145 and die plate 153 and secured by a press fit between die fingers 161 and rotor base 145. Press fit is a light press between ½ to 1/1000 press. Die fingers 161 are fabricated from rectangular cold rolled 303 stainless steel bars. A cutter holder 165 is clamped to rotor base 145 by tightening clamping bolt 169. External cutter 174 is coupled to cutter holder 165 by cutter screw 179. Replacing the external cutters is a time consuming task because of the alignment the external cutters 174 require. Since the cutter holder 165 is clamped to the rotor base 145 considerable time is required to align the external cutters 174. Another design flaw results in broken cutter holders 165 by over tighten the bolt 169. A plug 183 is coupled to rotor base 145 by a plug set screw 185 thereby sealing the center of rotor assembly 109. Rotor coupling set screws 189 are used to couple rotor assembly 109 to machine 101.

Die fingers 161 wear out quickly due to the friction of the corn meal and to acids, starches, and moisture contained in the corn meal. The normal life of the die fingers 161 is 350 to 400 hours of operation. Approximately two hours are required to replace the three die fingers 161. The considerable down time results from being forced to remove the rotor base 145. Removal of the rotor base 145 is necessary because the die fingers 161 can only be removed from the rotor base 145 when the rotor base 145 is not installed. Additionally the die plate 153 cannot be replaced without removal of the rotor base 145 because of the location of the socket cap screws 157. Additional down time occurs because of the time required to realign the rotor assemble 109 after replacing the die fingers 161 and the limited access to the rotor assembly 109 in the servicing distance 117. Additionally the preferred method to remove the worn die fingers 161 from the rotor base 145 consist of hammering the worn die fingers 161 out of the rotor base 145 to overcome the press fit. If a mechanic slips and strikes the rotor base 145 instead of the die fingers 161 then the rotor base 145 may be damaged by the errant blow.

Thus, there exists significant room for improvement in the art for overcoming these and other shortcomings of conventional extruder machine for extruding randomly shaped snacks.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
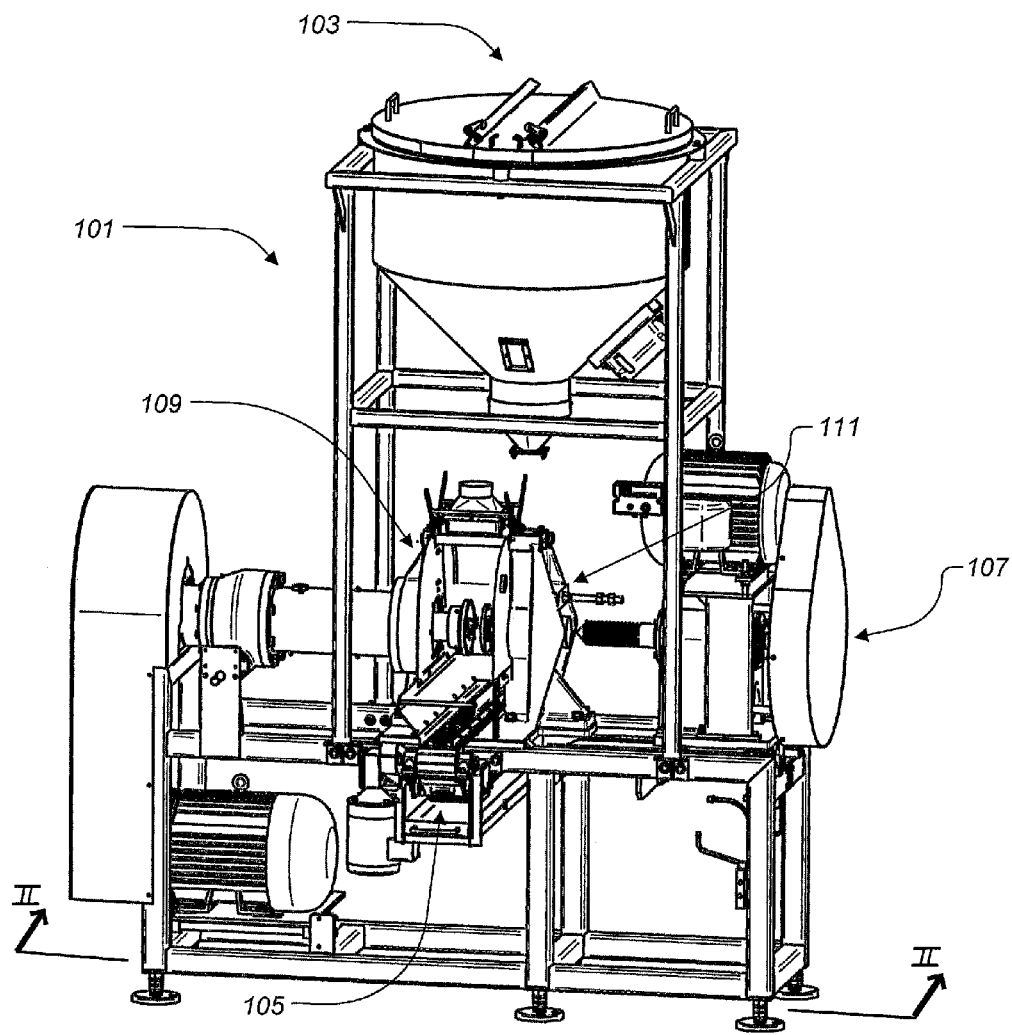
FIG. 1 is a perspective view of a conventional extruding machine.
Figure 2:
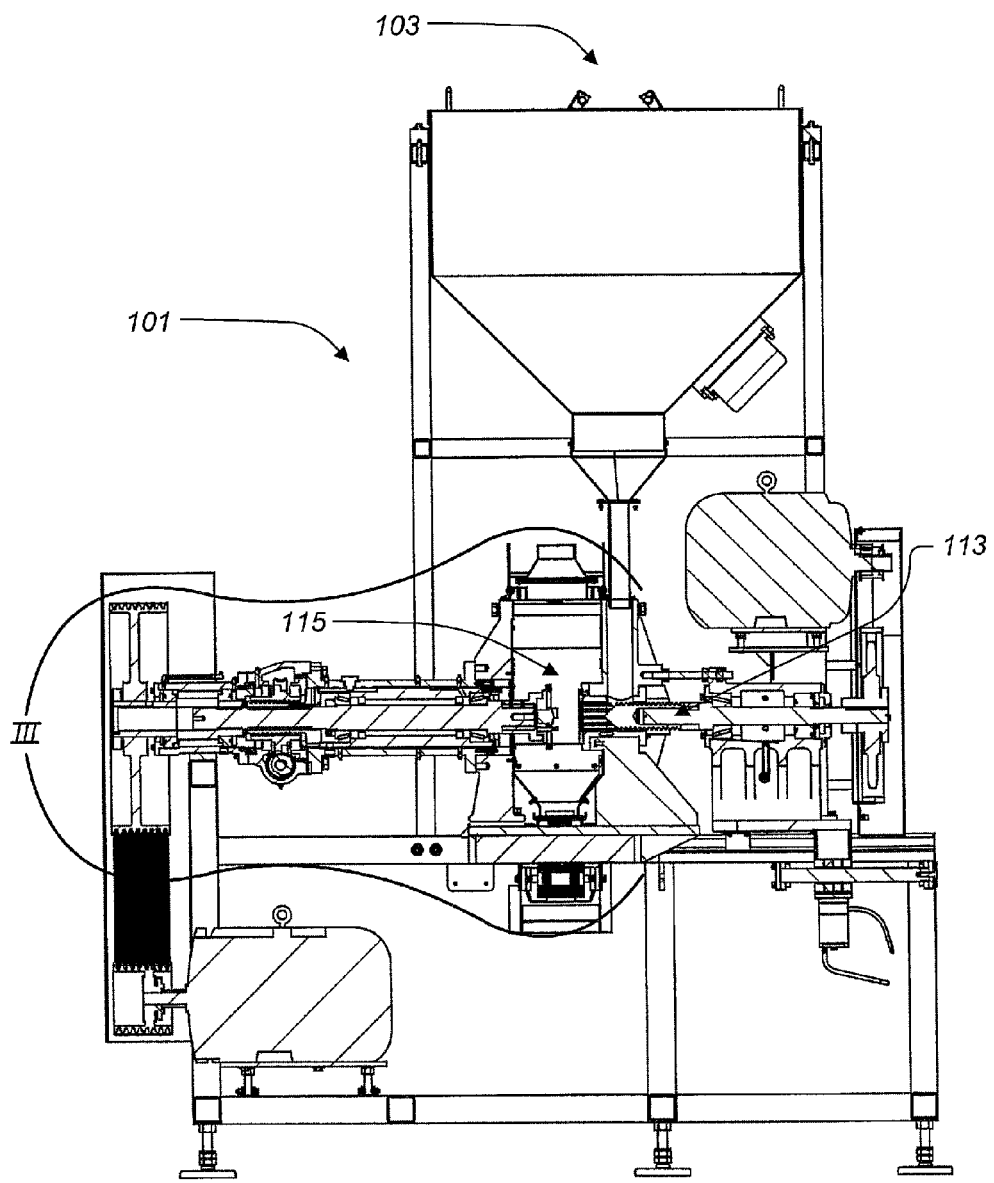
FIG. 2 is a cross-sectional view of the conventional extruding machine of FIG. 1 taken at II-II in FIG. 1.
Figure 3:
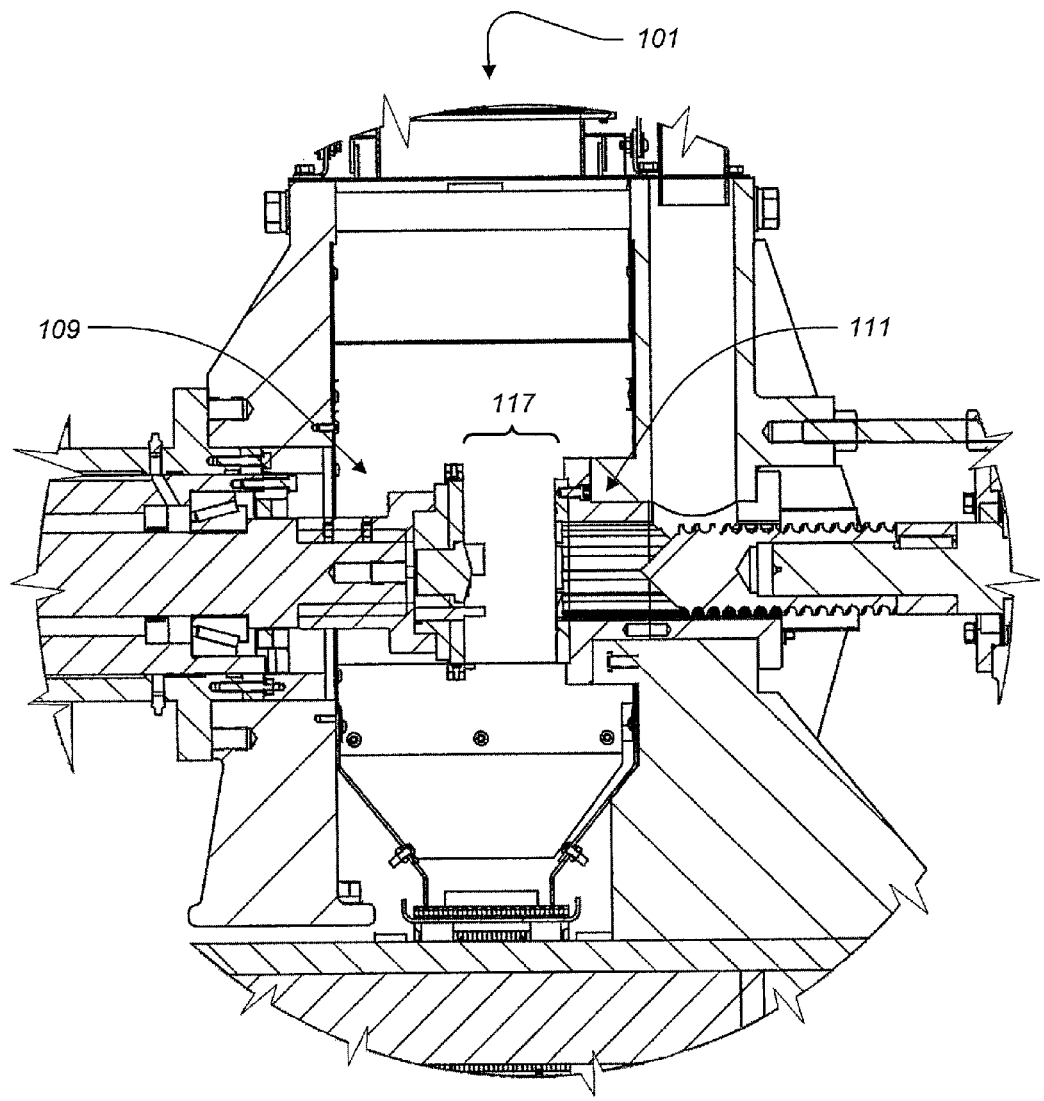
FIG. 3 is a partial enlarged cross-sectional view of the conventional extruding machine of FIG. 2.
Figure 4:
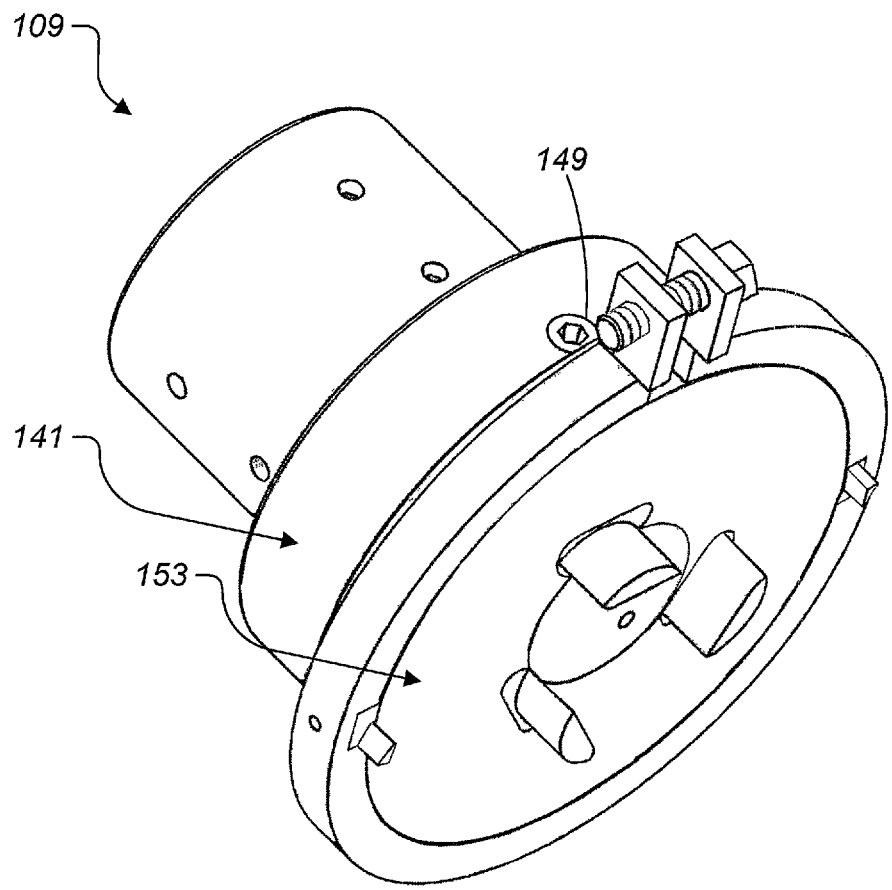
FIG. 4 is a perspective view of a conventional rotor assembly.
Figure 5:
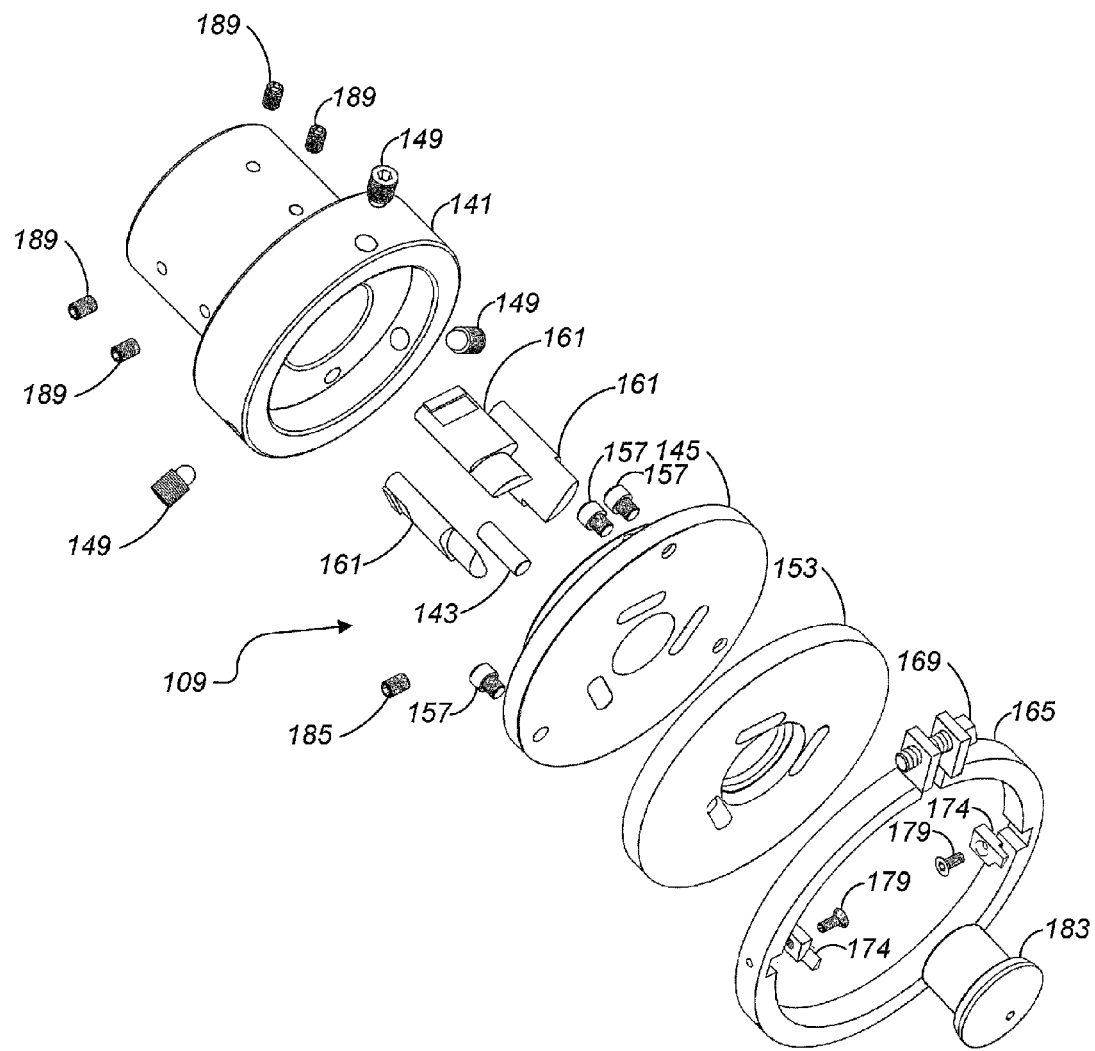
FIG. 5 is an exploded perspective view of conventional rotor assembly of FIG. 4.

While the assembly of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the rotor assembly are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 6:
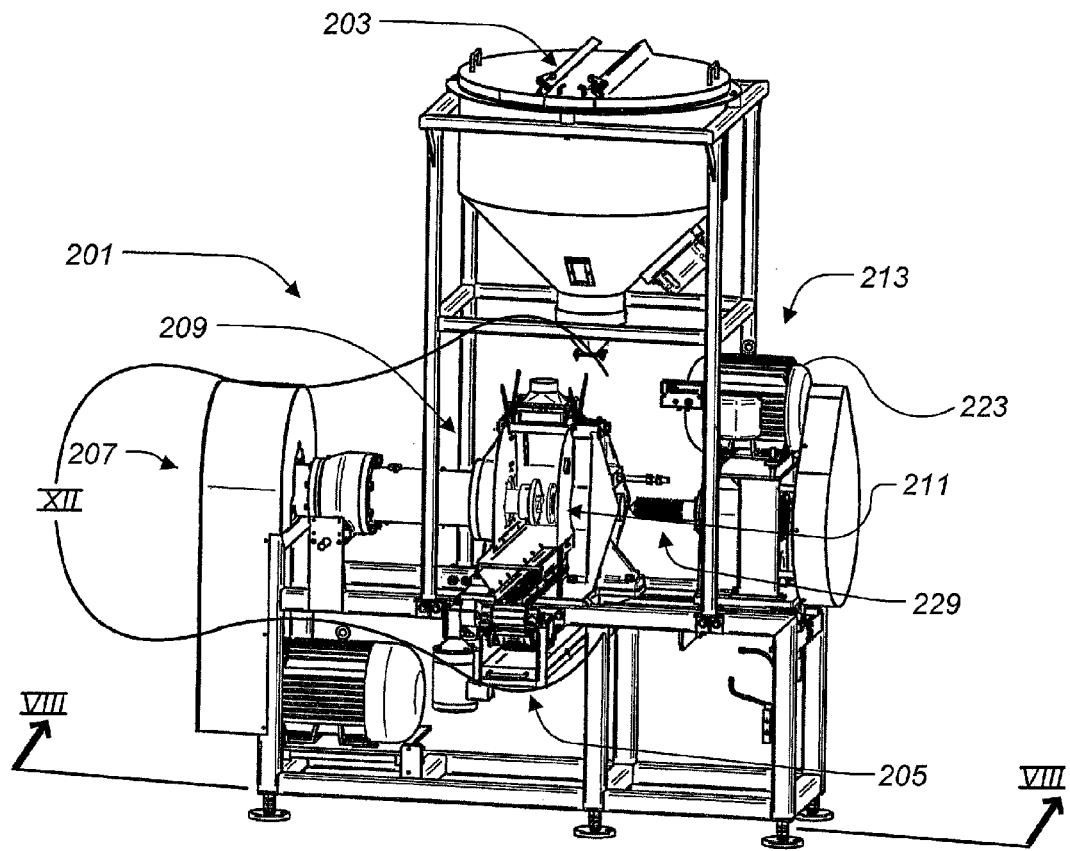
FIG. 6 is a perspective view of an improved extruding machine according to the present application.

Referring to FIG. 6 in the drawings, a preferred embodiment of an improved extruding machine for extruding randomly shaped cornmeal snacks according to the present application is illustrated. Randomly shaped cornmeal snacks sold under the trademark CHEETOS® are capable of being extruded from this extruder, however, other extruded snacks could be fabricated. CHEETOS® are but one brand of randomly shaped snacks that can be fabricated from extruders according to the present application. Other randomly shaped snacks could be fabricated from a material other than cornmeal, such as potato, seaweed, rice, cassava, parsnip, and carrot. An improved extruder machine 201 having a hopper assembly 203, a conveyer assembly 205, and an extruding assembly 207. Furthermore, extruding assembly 207 includes a rotor assembly 209, a stator assemble 211, and an auger assembly 213. Auger assembly 213 includes an auger motor assembly 223 coupled to a single screw auger assembly 229. A limitation with single screw auger is their tendency to slip, wear out quickly, and the limited pressure they can apply to the extruder.

Figure 7:
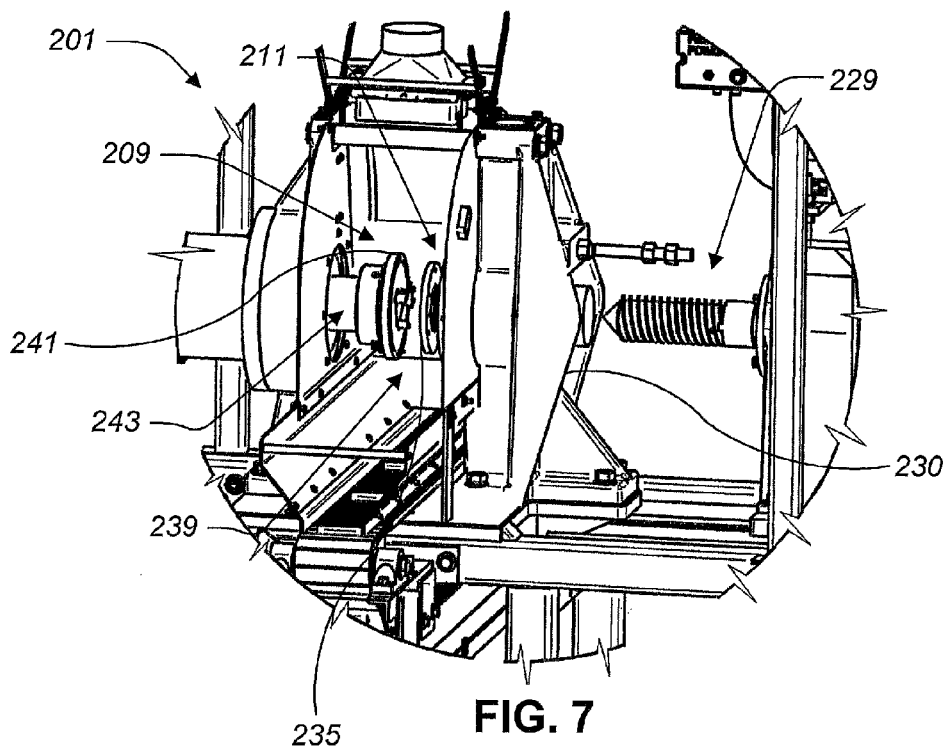
FIG. 7 is a partial enlarged view of the improved extruding machine of FIG. 6 according to the present application.

Referring now also to FIG. 7 in the drawings, an enlarged perspective view of improved extruding machine 201 is illustrated. Single screw auger assembly 229 is coupled to stator assembly 211 and coupled to an auger interface 230. As shown in FIG. 6 and FIG. 7 single screw auger assembly 229 retracts from auger interface 230 for maintenance. Stator assembly 211 includes a stator die plate 235 and a stator mounting assembly 239. Rotor assembly 209 includes a rotor head assembly 241 coupled to a drive shaft assembly 243. Rotor head assembly 241 is capable of rotating about a center axis and is capable of moving axially in relation to stator assembly 211.

Figure 8:
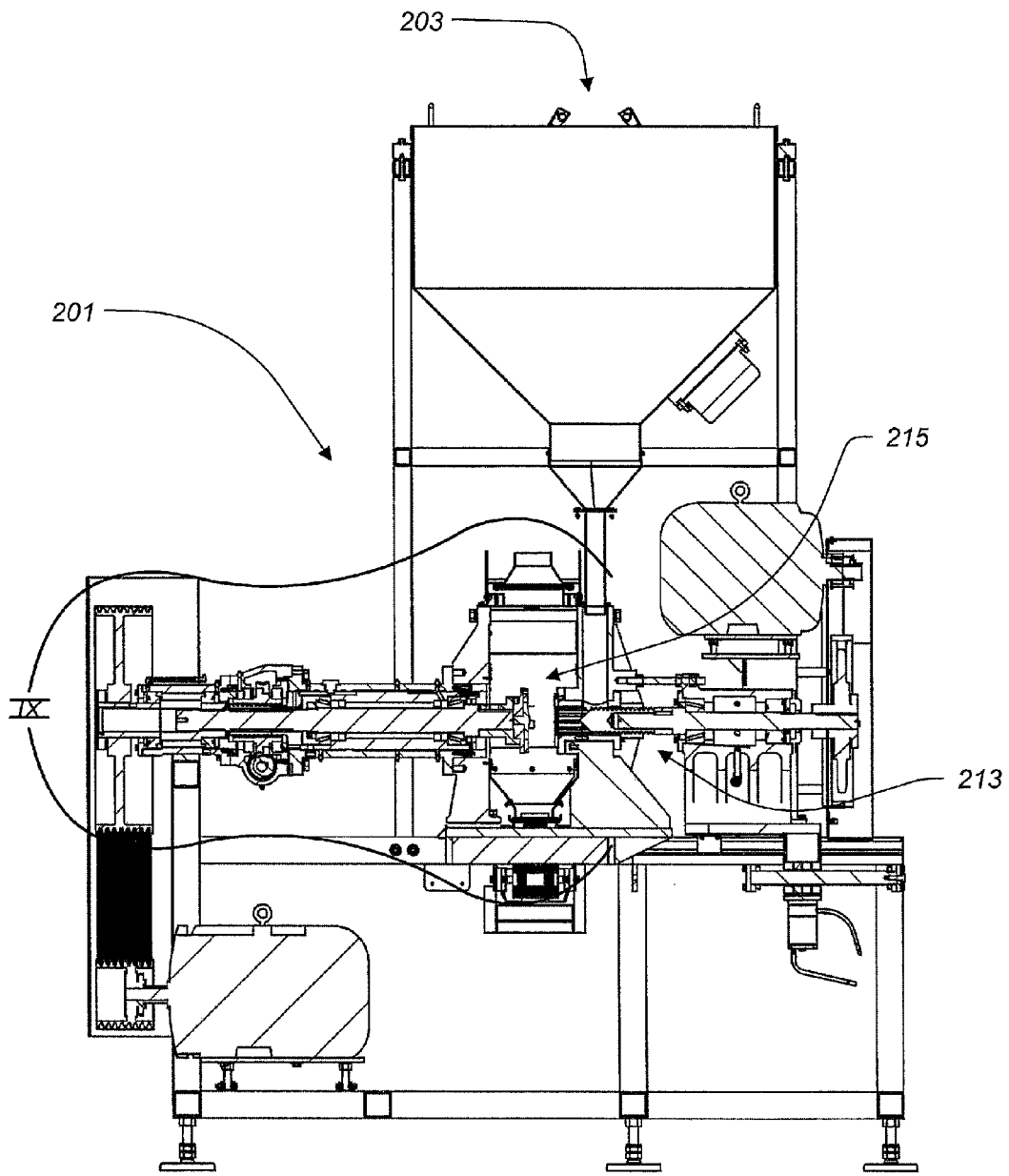
FIG. 8 is a cross-sectional view of the improved extruding machine of FIG. 6 taken at VIII-VIII in FIG. 6 according to the present application.
Figure 9:
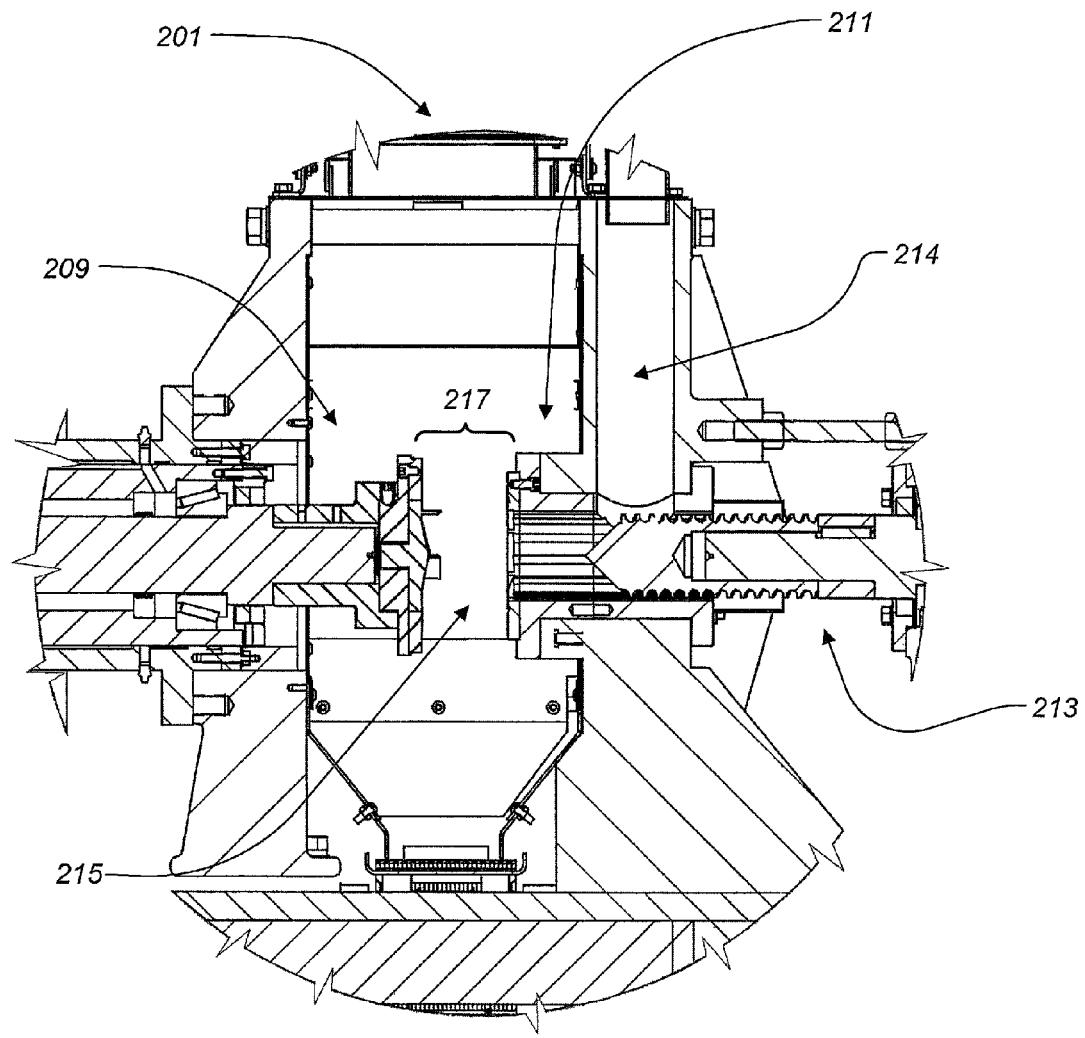
FIG. 9 is a partial enlarged perspective view of improved extruding assembly according to the present application.

Referring now also to FIG. 8 in the drawings, a cross sectional view of improved extruder machine 201 is illustrated and to FIG. 9, an enlarged view of FIG. 8 is illustrated. Material to be extruded, usually cornmeal with selected moisture content, is fed to an auger assembly 213 by hopper assembly 203. Auger assembly 213 feeds cornmeal to the extruder assembly 215 through a chute 214. Extruder assembly 215 includes rotor assembly 209, stator assembly 211, and a servicing distance 217. Servicing distance 217 is the spacing between the rotor assembly 209 and the stator assembly 211. Servicing distance 217 is varied by moving the rotor assembly 209 in relation to the stator assembly 211. Typically while the machine 201 is serviced the servicing distance 217 is no more than a few inches. The servicing distance 217 allows a technician to maintain both the stator assembly 211 and the rotor assembly 209. Due to the servicing distance 217 having a limited amount of travel all tooling for maintenance to rotor assembly 209 and stator assembly 211 are limited in travel and therefore it is time consuming to remove a significant number of fasteners for maintenance of rotor assembly 209 and stator assembly 211.

Figure 10:
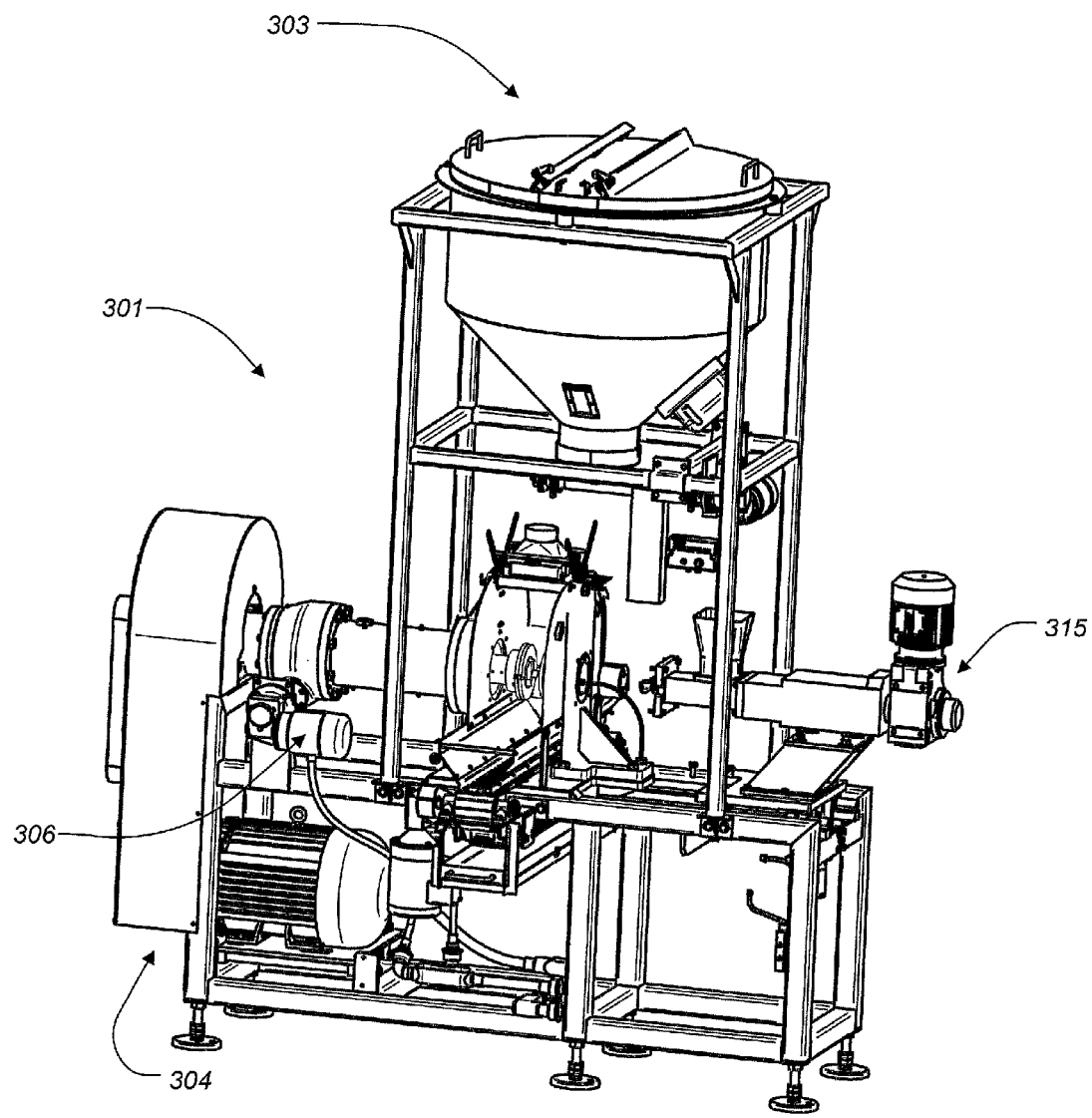
FIG. 10 is a perspective view of an improved extruding machine having a twin threaded screw auger according to the present application.
Figure 11:
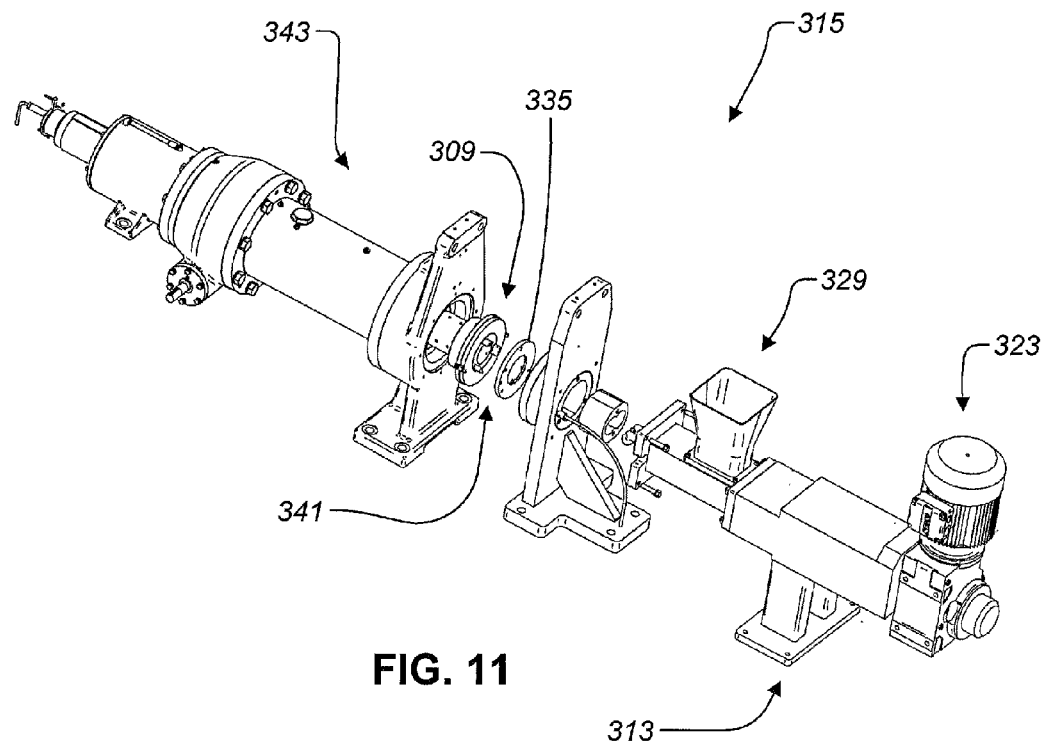
FIG. 11 is an exploded perspective view of improved extruding assembly having a twin threaded screw auger according to the present application.
Figure 12:
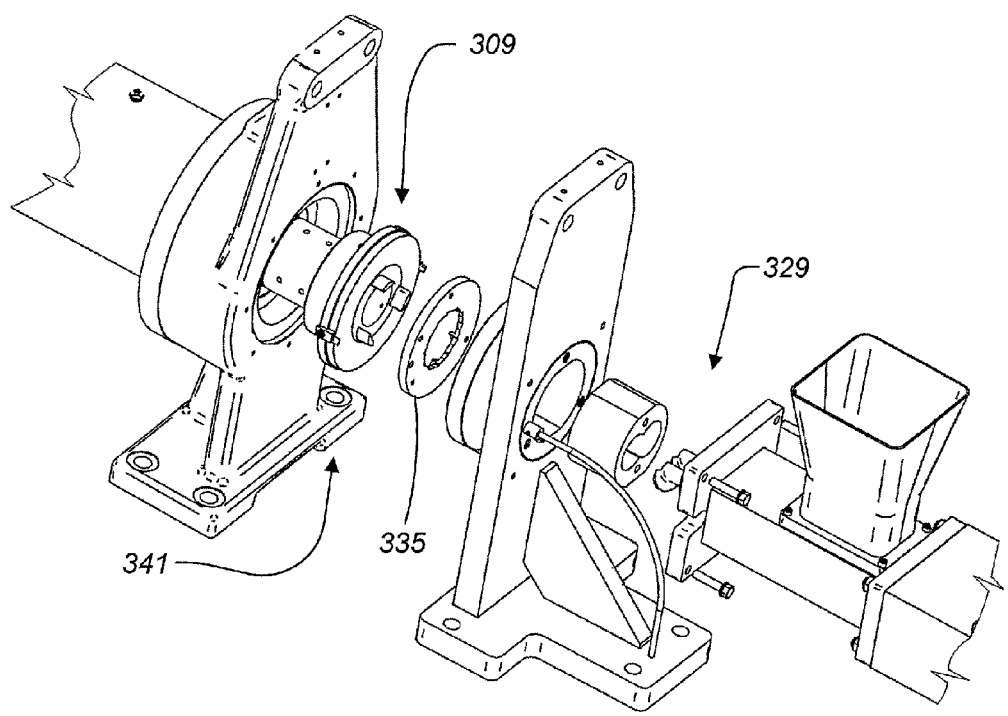
FIG. 12 is a partial enlarged exploded perspective view of improved extruding assembly having a twin threaded screw auger from FIG. 11 according to the present application.
Figure 13:
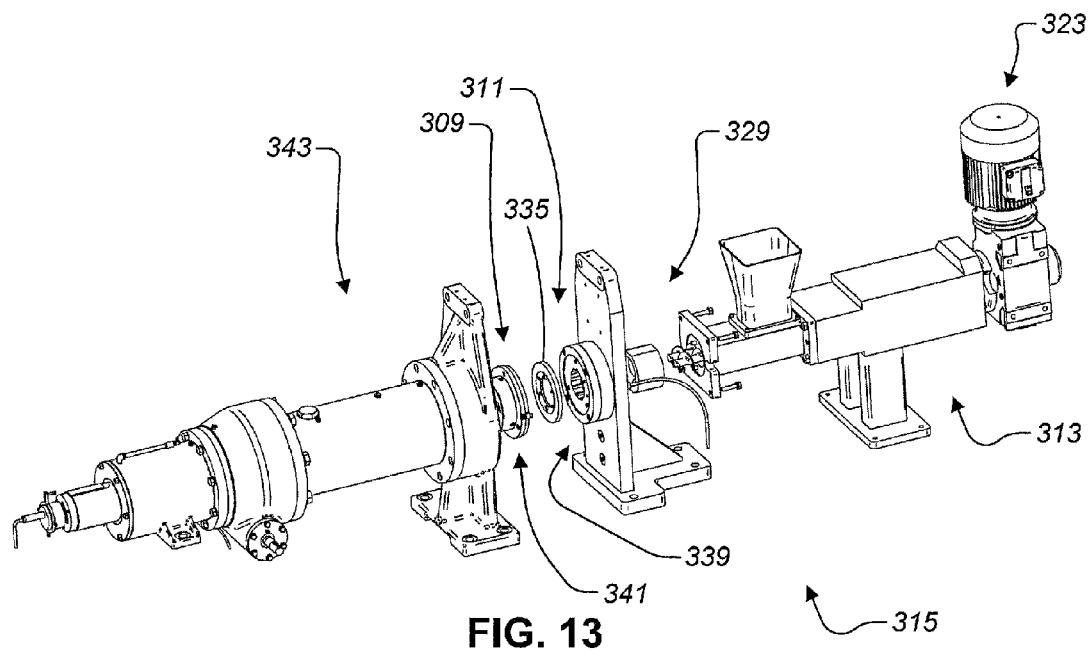
FIG. 13 is an exploded perspective view of improved extruding assembly having a twin threaded screw auger according to the present application.
Figure 14:
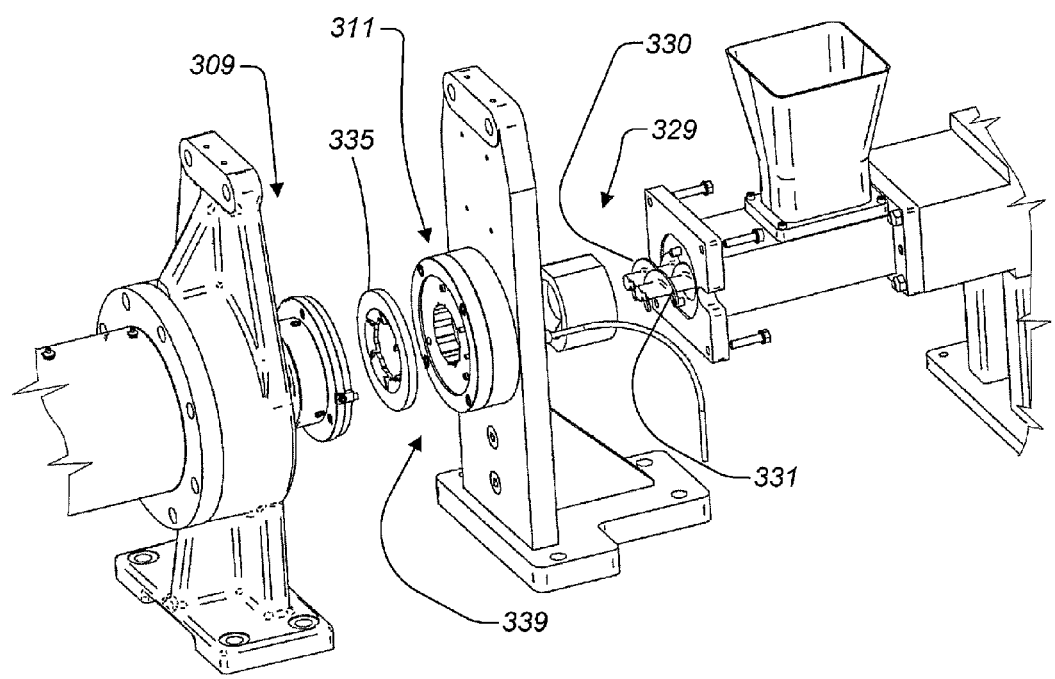
FIG. 14 is a partial enlarged exploded perspective view of improved extruding assembly having a twin threaded screw auger from FIG. 13 according to the present application.

Referring now also to FIG. 10 the drawings, an alternative embodiment of extruder machine 301 according to the present application is illustrated. Extruder machine 301 includes an extruder assembly 315, a hopper assembly 303, a drive assembly 304, and a servicing assembly 306.

Referring now also to FIGS. 11, 12, 13, and 14 in the drawings, an alternative embodiment of extruder assembly 315 according to the present application is illustrated. Extruder assembly 315 includes a rotor assembly 309, a stator assembly 311, and an auger assembly 313. Auger assembly 313 includes an auger motor assembly 323 coupled to a multi screw assembly 329. Multi screw assembly 329 is coupled to stator assembly 311. In the preferred embodiment multi twin screw assembly 329 includes a first auger screw 330 and a second auger screw 331 that are parallel to each other and rotate in the same direction. In an alternative embodiment the multi auger screws are parallel and rotate in opposite directions. In an alternative embodiment there would be additional augers screws, such as a third auger screw and so forth as long as space in auger assembly would allow. Multiple auger screws reduce the slippage and wear associated with single screw augers and allow a greater variety of ingredients to be extruded. Stator assembly 311 includes a stator die plate 335 and a stator mounting assembly 339. Stator die plate 335 is fabricated from stainless steel. Rotor assembly 309 includes a rotor head assembly 341 coupled to a drive shaft assembly 343. Drive shaft assembly 343 is coupled to drive assembly 304. Rotor head assembly 341 is capable of rotating about a center axis by drive assembly 304 and is capable of moving axially in relation to stator assembly 311 by means of servicing assembly 306.

Figure 15:
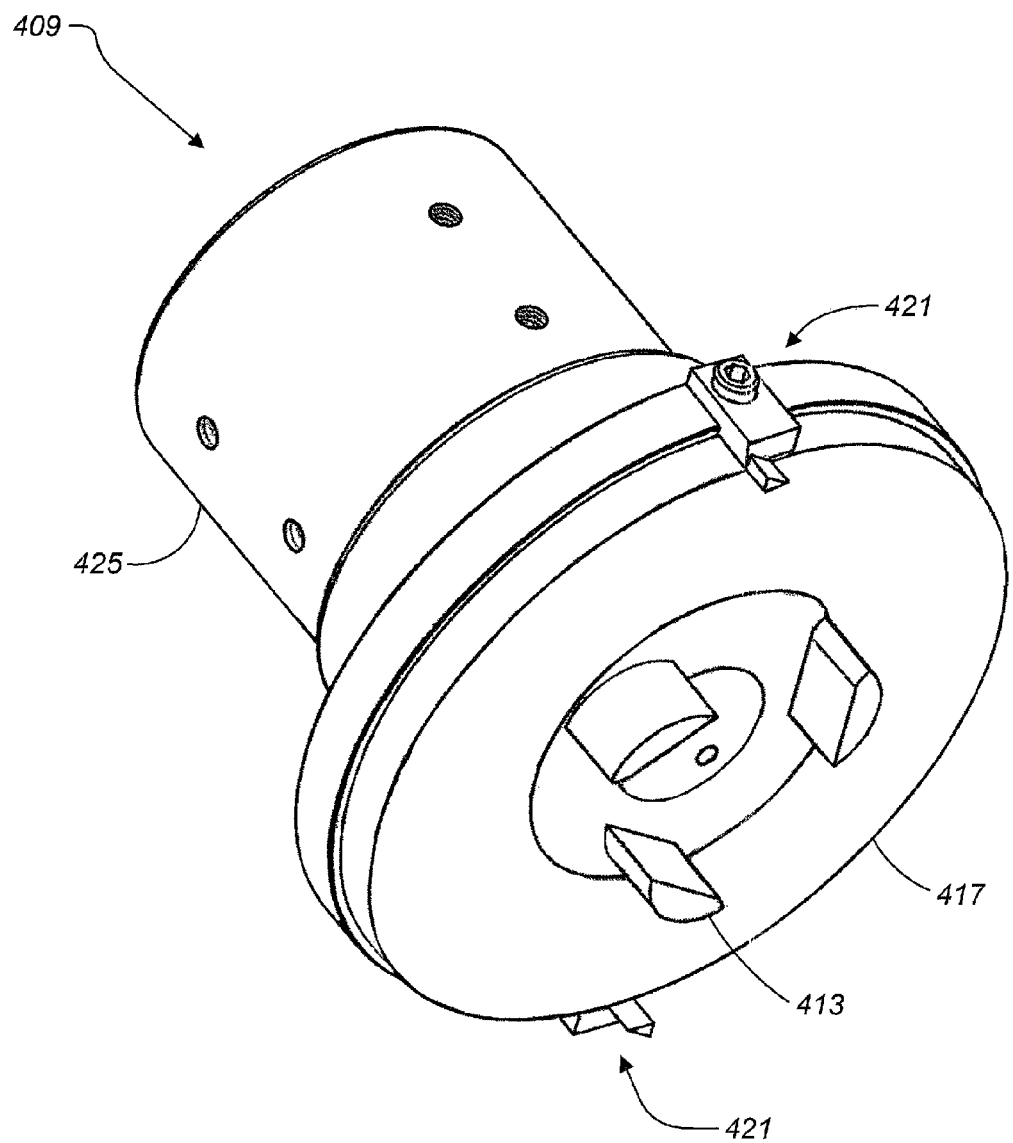
FIG. 15 is a perspective view of an improved rotor assembly according to the present application.
Figure 16:
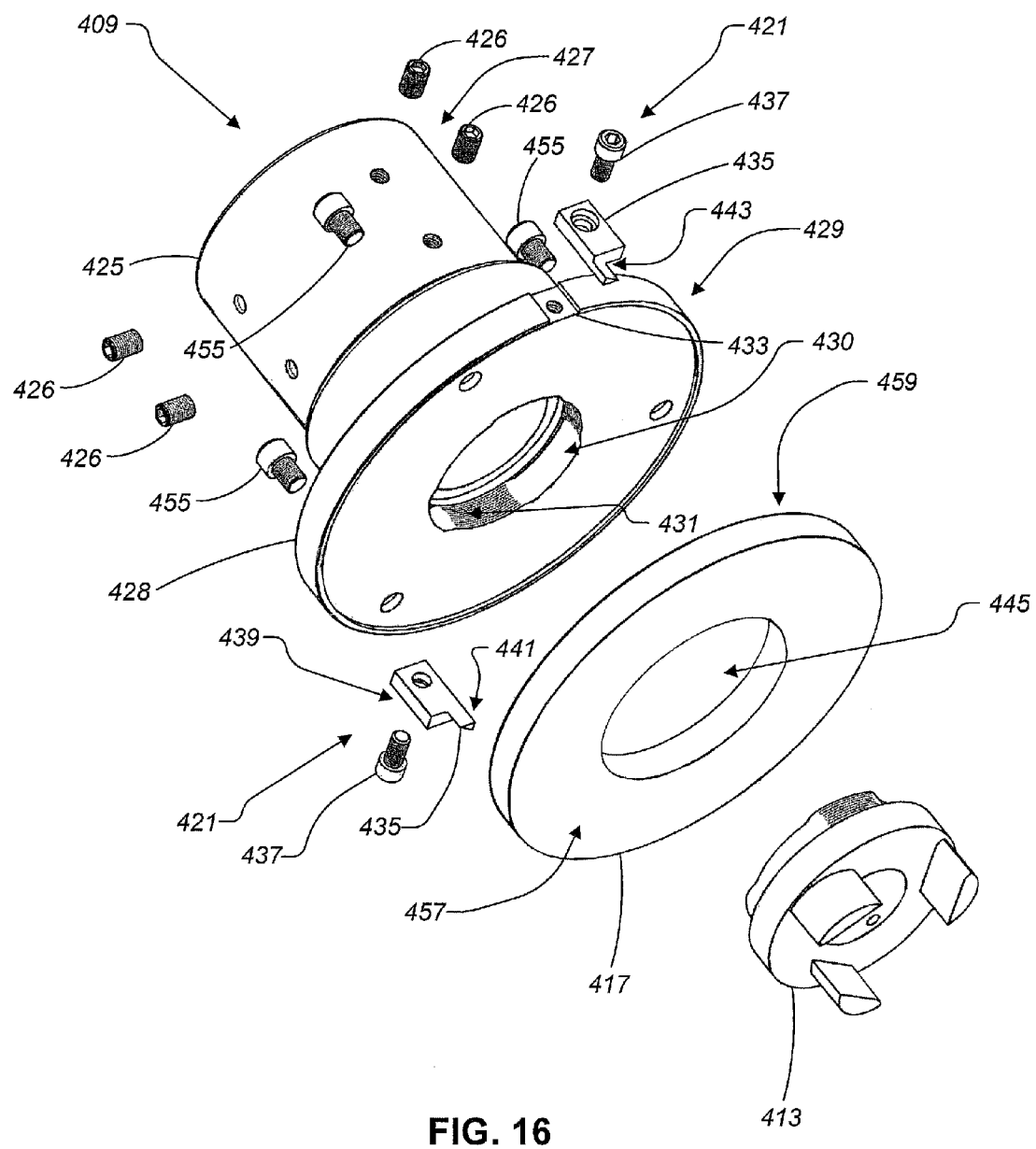
FIG. 16 is an exploded perspective view of improved rotor assembly of FIG. 15 according to the present application.

Referring now also to FIG. 15 in the drawings, a perspective view of a preferred embodiment of a rotor assembly 409 is illustrated and to FIG. 16 in the drawings, an exploded view of rotor assembly 409 is illustrated. Rotor assembly 409 includes a one-piece finger member 413, a die plate 417, cutting assemblies 421, and a rotor base 425. Rotor base 425 has a first end 427 and a second end 429. First end 427 of rotor base 425 is secured to extruding machine by tightening set screws 426. Second end 429 of rotor base 425 includes a rotor base flange 428. In the center of rotor base flange 428 is a finger member receptacle 430 configured for releasable attachment of finger member 413. Finger member receptacle 430 has multi-indexed non-continuous threaded surfaces 431. In other embodiments the number of indexed threaded surfaces could be greater or less than three. In the preferred embodiment the finger member receptacle 430 includes three indexed threaded surfaces 431 with higher pitch threads. Alternatively or in combination with the high pitch of the threading, the pitch of the lead angle is different than the pitch of the threading. The threading is proprietary and serves to reduce imitators duplicating unauthorized replacement parts and aids in the quick removal of parts from the assembly. In alternate embodiments the entire receptacle is threaded. Located on the circumference of rotor base flange are cutting assembly slots 433.

Cutting assemblies 421 include an external cutter 435 and a cutting screw 437. External cutter 435 includes a holder portion 439 and a blade portion 441. A cutter interface 443 is the region where the holder portion 439 and the blade portion 441 intersect. In this embodiment cutter interface 443 is filleted, however, it should be apparent that cutter interface 443 might be curved and non-filleted. External cutters 435 are coupled to rotor base 425 and are secured by cutting screws 437. External cutters 435 are prevented from rotating relative to rotor base 425 by being located in the cutting assembly slots 433 located on the rotor base flange 428. Additionally, cutting assembly slots 433 ensure blade portion 441 is precisely located axially.

Die plate 417 has a first end 459 and a second end 457 located at the opposite end. Die plate 417 includes a centered aperture 445 to allow the finger member 413 to mount to the rotor base 425 through die plate 417. Die plate 417 is coupled to rotor base 425 by socket cap screws 455. Socket cap screws 455 mount through the rotor base flange 428 and into the second end 459 of the die plate 417. It is important that first end 457 of die plate 417 does not contain fasteners. First end 457 of the die plate 417 is in constant contact with the ground cornmeal therefore any fasteners that were exposed in first end 457 would be clogged with the ground corn meal. This clogging would inhibit the maintenance of the extruding machine 301. In the preferred embodiment die plate 417 is fabricated from stainless steel, preferably a 304 stainless steel. In an alternative embodiment die plate 417b is fabricated from bronze. Die plates 417 fabricated from stainless steel require additional surface preparation including bead blasting and coated carbide cutters to machine the part. The additional surface preparation is needed in order for the die plates 417 fabricated from stainless steel to mimic the frictional twisting generated by die plates 417b fabricated from bronze. Die plates 417 fabricated from stainless steel are lasting three times longer or more than dies plates 417b fabricated from bronze.

Figure 17:
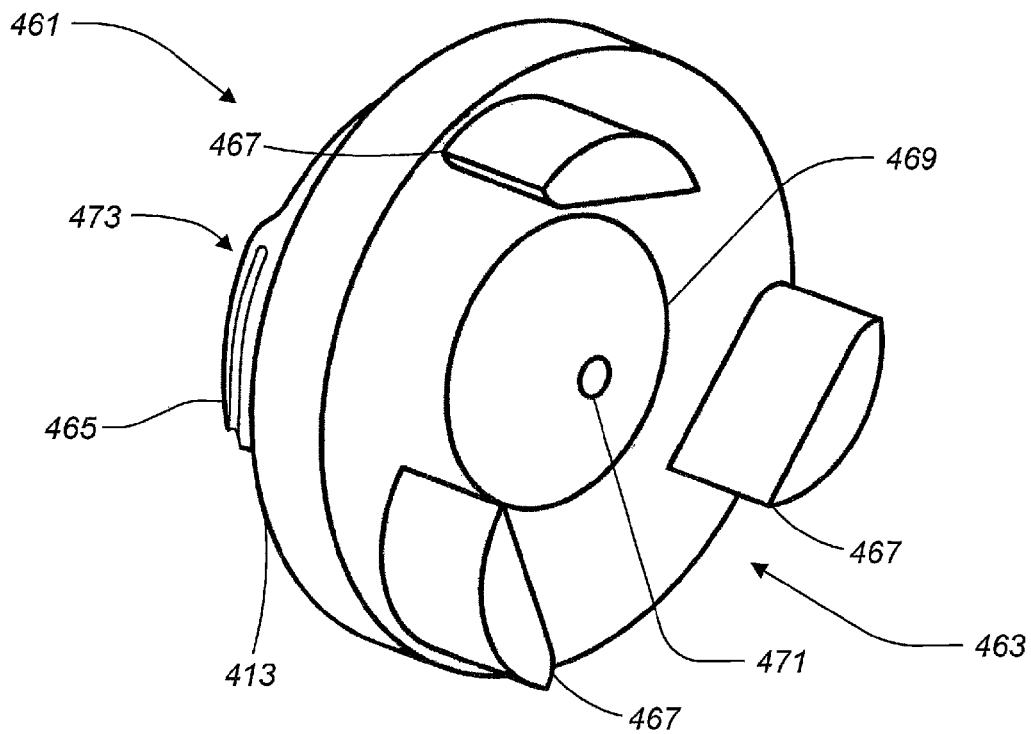
FIG. 17 is a perspective view of a finger member according to the present application.
Figure 18:
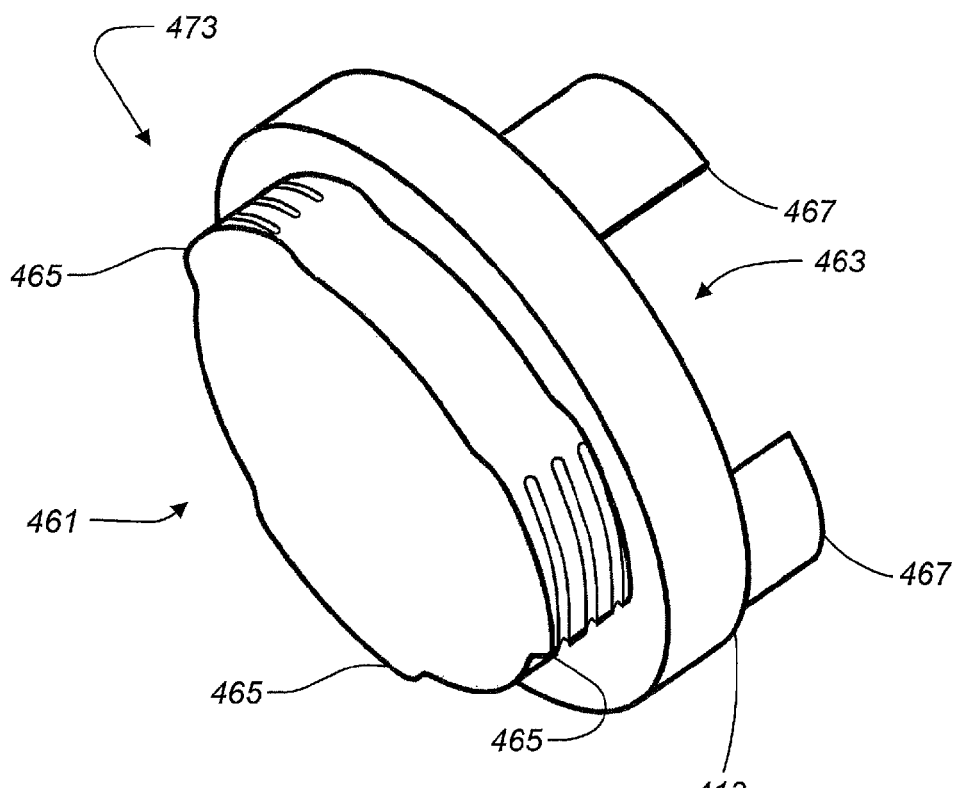
FIG. 18 is a perspective view of a finger member according to the present application.

Referring now also to FIG. 17 and FIG. 18 in the drawings, perspective views of a finger member 413 are illustrated. Finger member 413 has a first end 461 and a second end 463. In the preferred embodiment the diameter of the second end 463 is uniform. In alternate embodiments the diameter of the second end could have a taper and or a rubber gasket to minimize the migration of cornmeal. Preferably first end 461 has multi-indexed non-continuous threaded flanges 465; however the threading could be continuous. The threading is proprietary and serves to reduce imitator duplicating unauthorized replacement parts and aids in the quick removal of parts from the assembly. In the preferred embodiment the pitch of the threading is higher than normal threading and very course. The courser the threading the easier to remove the finger member 413. The higher pitch allows the finger member 413 to engage with less rotational distance compared to a finger member threaded with lower pitch threads. Alternatively or in combination with the high pitch of the threading, the pitch of the lead angle is different than the pitch of the threading. A benefit of the custom threading is reduced unauthorized production of knock-off parts. Second end 463 has fingers 467 and a cone 469. At the top of the cone 469 is a flattened area 471. Finger member 413 is preferable machined from a round bar of 303 stainless steel. Finger assemblies fabricated from round bars of 303 stainless steel have more durability than previous fingers made from flat bars of 303 stainless steel due to a different stainless steel manufacturing process or perhaps the arrangement of the grains in the round bar compared to the flat bar. In other embodiments finger member 413 may be fabricated from other metals as long as it was economically feasible to fabricate them and the finger member 413 proved durable.

Flattened area 471 is critical in adjusting the augers position when there is a single auger screw. The auger is properly engaged with rotor assembly 409 by adjusting auger until contact is made between auger and flattened area 471. The auger is then backed away from the flattened area a short amount. In the preferred embodiment finger member 413 has three fingers 467, however, in other embodiments the number of fingers is greater than three and in other embodiments the number of fingers may be less than three but no less than one finger. The orientation and the position of the fingers 467 relative to the finger member 413 may be adjusted. Mounting of finger member 413 to rotor base 425 in the preferred embodiment is by a quick releasing threaded coupling 473. In the preferred embodiment the finger member 413 can be released from the rotor base by rotating finger member approximately only 60 degrees relative to rotor base 425. This greatly speeds up the removal and replacement of finger member 413.

Figure 19:
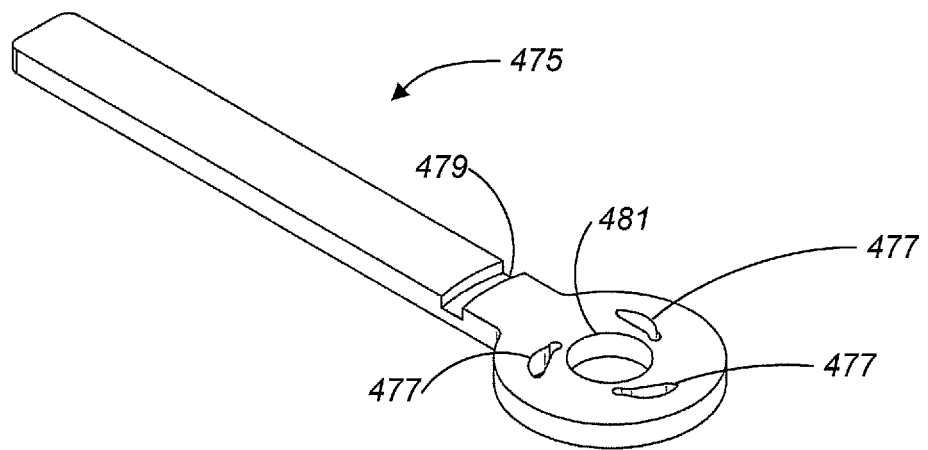
FIG. 19 is a perspective view of a finger member wrench according to the present application.

Referring now also to FIG. 19 in the drawings, a perspective view of a finger member wrench 475 is illustrated. Removal of finger member 413 from rotor base 425 is assisted by utilizing finger member wrench 475 with cutouts 477. Cutouts 477 are shaped like fingers 467 with extra material removed to protect edges of fingers 467. Finger member wrench 475 has a groove 479 cut into it and a hole 481 located between cutouts 477. Finger member wrench 475 could also used for installing finger member 413 into rotor base 425.

It is apparent that an assembly with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A one-piece finger member for an extruding machine for extruding food items, the one-piece finger member comprising:
    a first end with a threaded interface; and
    a second end with a plurality of fingers spaced around a centrally located cone; wherein the fingers extend in the same direction as the cone;
    wherein the cone is conical shaped; and
    wherein the cone comprises a flattened area at an apex of the cone.

2. The one-piece finger member according to claim 1, wherein the threaded interface further comprises:
    a multi-indexed non-continuous threaded interface having three indexed threaded surfaces.

3. The one-piece finger member according to claim 1, wherein the threaded interface further comprises:
    a pitch difference between lead angle threading and the rest of the threading.

4. The one-piece finger member according to claim 1, wherein the threaded interface is capable of engaging completely to a rotor base in approximately ⅙ of a revolution.

5. The one-piece finger member according to claim 1, wherein the threaded interface is selectively chosen to thwart counterfeiting.

6. The one-piece finger member according to claim 3, wherein the pitch difference is selectively chosen to thwart counterfeiting.

7. The one-piece finger member according to claim 1, wherein the one-piece member is fabricated from a round bar of stainless steel.

* * * * *